INVENTOR.
David Sciaky
BY

United States Patent Office 3,313,910
Patented Apr. 11, 1967

3,313,910
ELECTROMAGNETIC FORCE SYSTEM
David Sciaky, Chicago, Ill., assignor to Welding Research, Inc., Chicago, Ill., a corporation of Illinois
Filed Jan. 6, 1966, Ser. No. 519,147
12 Claims. (Cl. 219—86)

Among the known means for applying a controlled mechanical pressure are hydraulic and pneumatic systems which consist of a pressure cylinder and a piston, or a flexible membrane or diaphragm which transmits pressure to the work by means of a rod. The magnitude of the pressure can be adjusted from a minimum to a maximum by adjusting the fluid pressure by means of a reducing valve when using compressed air, or of a relief bypass valve in case of hydraulic pressure.

For the resistance spot welding of certain metals or alloys it has been found necessary to vary during the operation the electrode force obtained in the above manner in order to achieve high quality crack-free welds.

While an electrode force cycle consisting of a "high-low-high" sequence of steps with the passing of welding current during the low pressure period has been found satisfactory for certain materials, a more elaborate and progressive pressure variation is needed for the achievement of high quality welds on certain crack-sensitive, high strength, heat treated alloys. In certain cases the electrode force has to be progressively changed frm a pre-set high level to a pre-set lower level, and this has to take place according to a predetermined law of variation during the flow of welding current. Following this period the electrode force has to be increased again to a value greater than the initial level. Such an electrode force program is only one example among many different ones required for the satisfactory welding of the wide range of engineering materials in use today.

In the simple welding force program described above, which consists of reducing stepwise the initial pressure and increasing it again to its initial value, it is only necessary to apply a "back pressure" of pre-set value to the opposite side of the piston, and then to remove it. In contrast to this simple program elaborate force programs as mentioned above cannot satisfactorily be accomplished with the use of back pressure. The reason is that the rate of pressure change in a back pressure chamber depends not only on the size of the orifice but also on the varying pressure differential between the back pressure chamber and the source of compressed air. Another reason is that each of the pressure levels requires an individual pre-set reducing valve and means for switching these valves and also means for removing the necessary amount of air from the chamber when switching from a higher to a lower level. Hydraulic devices, when used for electrode force programs, lack the speed of response needed when the sudden shrinkage of the weld nugget, upon interruption of the welding current, requires a fast follow up of the electrode.

The present invention has for its object a system for achieving pressure programs of unlimited variety.

Another object is to obtain pressure programs in which the rate of pressure change can be easily modified.

Another object is to achieve rapid pressure changes.

A further object is to attain within a program a great number of periods with levels of different magnitude.

Another object is to obtain a great accuracy in the magnitude of the pressure levels in spite of variation in any of the factors which would otherwise affect them.

Another object is to achieve a system which can readily be adapted to automatic programming by means of numerical or analog control.

A further object is to achieve a programming system which uses in combination pneumatic and electromagnetic means.

Another object is to provide a system in which an electromagnet means for production of pressure is combined with a pressure transducer.

A further object is to provide an electromagnetic means whose force can be maintained at a pre-set level, or varied in accordance with a pre-set program independently from factors which would cause variations as, for example, the air gap and temperature.

A further object is to produce a feedback regulated pressure system.

FIGS. 5, 6, 7, and 8 illustrate several typical force and current programs which are required and which are made possible through the use of the invention.

Figure 1:
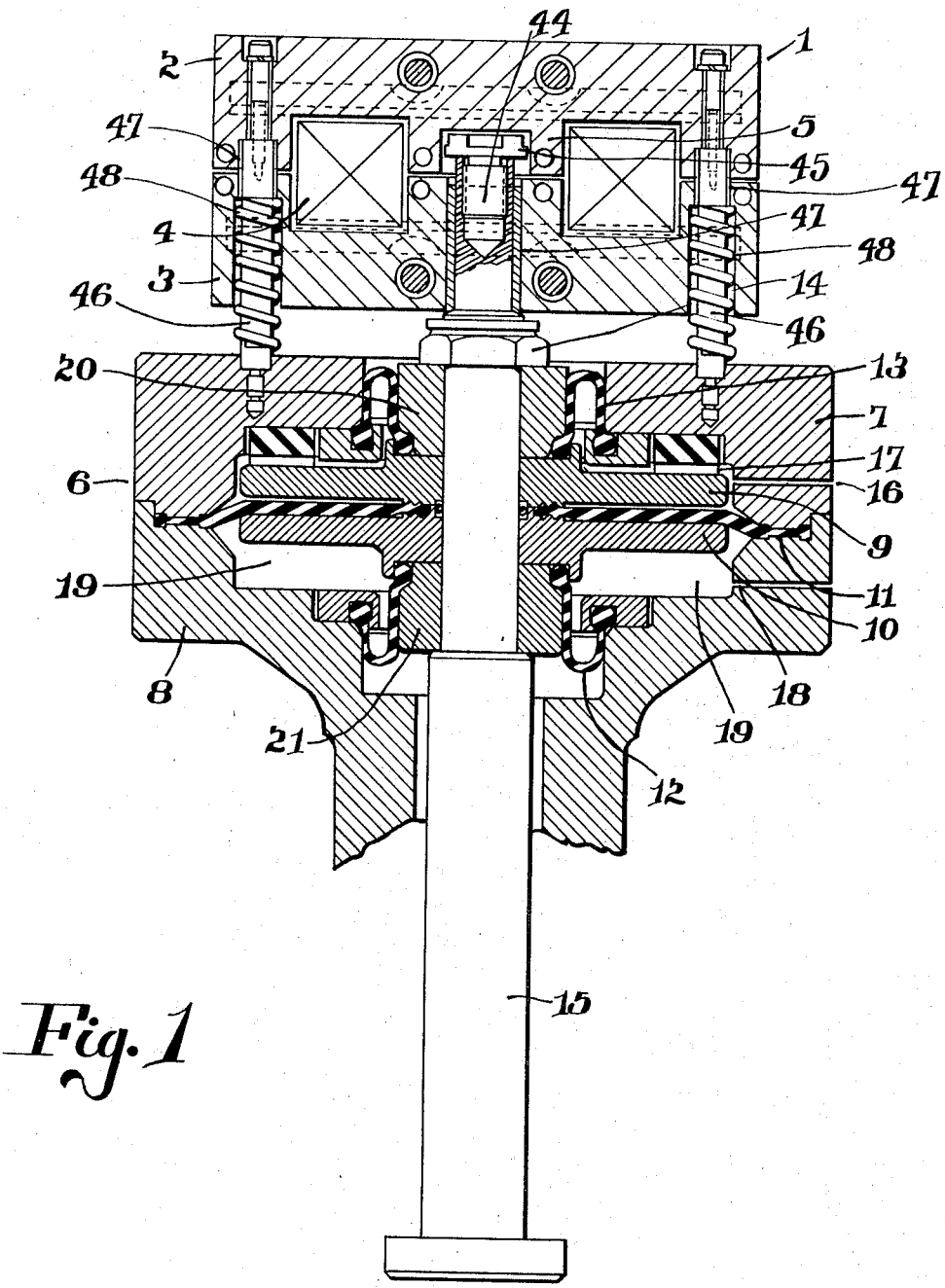
FIG. 1 is a sectional view of an apparatus according to the invention in which the magnetic force generator is installed to act in series with a pneumatic diaphragm type force generator.

FIG. 1 shows in section the magnetic force generator 1 consisting of iron circuits 2 and 3 and coil 4 which surrounds center leg 5 of the iron magnetic circuit. The pneumatic force generator 6 consists of two mating members 7 and 8 which when clamped together form two separate chambers 17 and 19 which are separated by the diaphragm 11. Diaphragm 11 is retained by members 9 and 10 and the two chambers are sealed from the outside atmosphere by seals 12 and 13. Diaphragm 11 and retaining plates 9 and 10, along with spacers 20 and 21, are assembled on shaft 15 and held in position by nut 14. Air entering the upper chamber 17 through port 16 will cause the shaft to move downward until the upper electrode 23 comes into contact with the workpiece 25 of FIG. 2 and exert a downward force. Air entering the lower chamber through port 18 will produce a counter force in the upward direction and cause shaft 15 to move upward.

The downward motion of the shaft 15 carries screw 44 downward and its head 45 comes in contact with the movable armature 3 causing it to move downward and increase the gap between the fixed and movable parts of the iron magnetic circuit. The movable part of the iron circuit (the armature) is guided by rods 46 and bushings 47 and held in the at rest position in close proximity with the fixed part of the iron magnetic circuit by means of springs 48 which exert a force in the upward direction sufficient to overcome the weight of the armature.

In the practical application of this device on a resistance welding machine having a welding capacity of ⅛″ to ⅛″ material, the gap between the electrodes is adjusted, for example, to ½″ and the distance between the surface underneath the head 45 of screw 44 and the top surface of the armature is set to ³⁄₁₆″. If two thicknesses of ⅛″ material are to be welded, the shaft 15 which carries the upper electrode of the welding machine will move downward ¼″ before the electrode meets the work. When the shaft has moved ³⁄₁₆″ downward the head of screw 44 will come in contact with the armature and the final ¹⁄₁₆″ travel of the shaft will cause the armature to separate from the fixed iron circuit by a gap of ¹⁄₁₆″.

If a thinner gauge of metal is to be welded; for example ¹⁄₁₆″, the total thickness of work between the electrodes will be ⅛″ and the stroke of the shaft 15 before the electrode makes contact with the work will be ⅜″. The gap between the movable armature and the fixed part of the iron circuit will then automatically become ³⁄₁₆″.

The force developed by the electromagnet will be less for the same current for the 3/16" gap than it is for the 1/16" gap. This falls in line with the requirement for welding since a lower welding and forging force is required for the thinner material. The method described herein for reducing the air gap in the magnetic circuit by limiting the stroke of the armature allows the use of the smallest possible electromagnet. When direct current is passed through coil 4 of the electromagnetic structure, the movable iron circuit armature 3, which is fixed to shaft 15, will exert a force in the upward direction. Since iron circuit 2 is fixed to members 7 and 8 of the pneumatic operator the net force exerted by shaft 15 will be the sum of the upward force exerted by 3 and the difference between the force exerted upward by the air in chamber 19 and the force exerted downward by the air in chamber 17. If the pressure in both chambers remains fixed the total pressure on the shaft may be varied by varying the current through coil 4. By applying or removing the current through coil 4 the force exerted on shaft 15 may be changed abruptly. By varying the current according to a pre-arranged program through coil 4, the pressure may be varied according to this pre-arranged program. Preferably the source of current supply to the electromagnet is of a regenerative type in that the electromagnetic energy stored is rapidly returned to the power supply line so that a rapid collapse of the magnetic force is realized. Preferably also the source of current is so arranged that it is capable of producing a high rate of rise of the magnetizing current through the use of a feedback amplifier which limits the magnetizing current to a predetermined level but allows the application of very high initial electromotive forces.

The springs 48 which come into play during the last portion of the stroke of the shaft 15 has the further effect of reducing the impact of the electrode upon the work. Energizing the coil during the downward motion would also reduce the impact.

An increase in the gap between electrodes due to normal wear of the electrode tips does not change excessively the force developed by the electromagnet since the increase in gap will be only a small percentage of the gap as set up initially.

Figure 2:
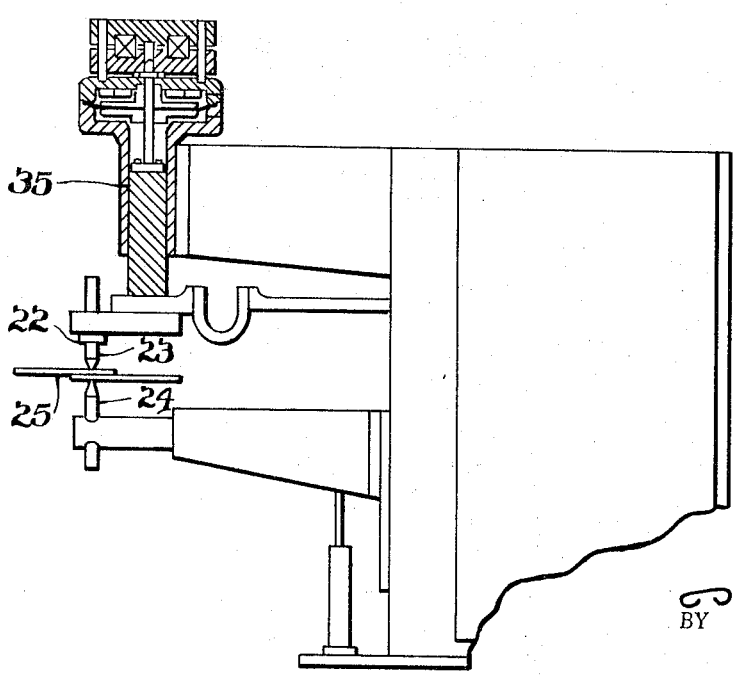
FIG. 2 shows a magnetic force generator installed upon a resistance welding machine which includes a force transducer.

FIG. 2 shows the apparatus of FIG. 1 mounted upon a resistance welder along with transducer means 22 which senses and produces a signal depending upon the final force exerted between the electrodes 23 and 24 between which the sheets 25 to be welded are placed. Through the use of the transducer and the suitable feedback regulator the force exerted upon the sheets to be welded may be made to follow a pre-set pattern.

Figure 3:
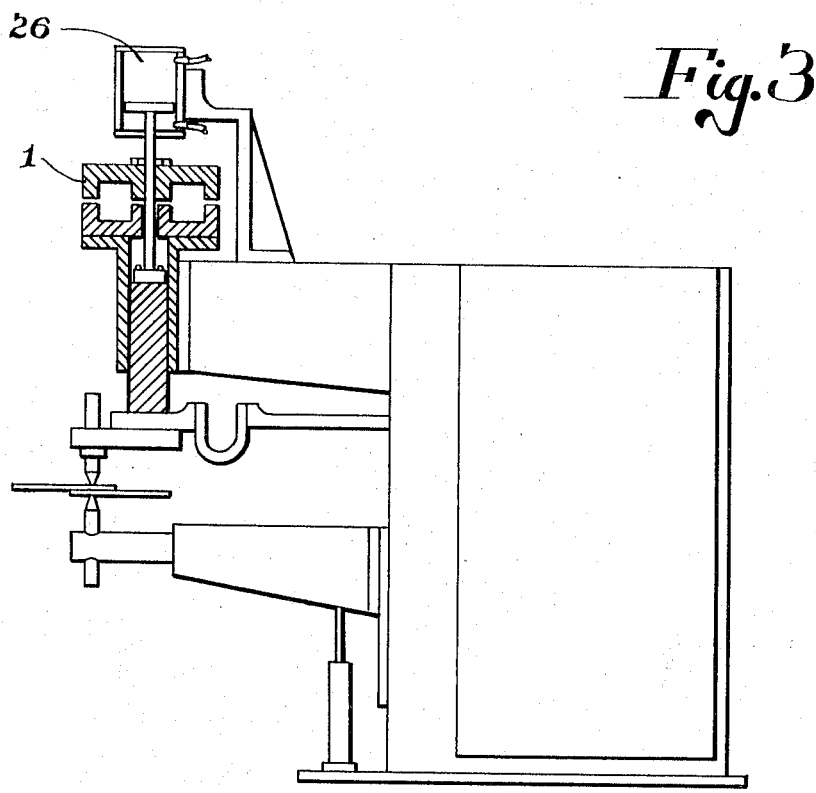
FIG. 3 shows a resistance welding machine which utilizes a magnetic force generator alone to develop the welding force.

FIG. 3 illustrates a variation in the system in which the pressure exerted between the electrodes is produced only by the electromagnetic force device. The pneumatic operator 26 is utilized to lift the upper electrode away from the work or bring it to the work but does not have the function of applying any force between the electrodes. The force applied between the electrodes will in this case be dependent upon the current flowing through the coil of the electromagnet. The force may be controlled by an open loop system or by a closed loop regulator utilizing a force transducer to sense the force exerted between the electrodes.

Figure 4:
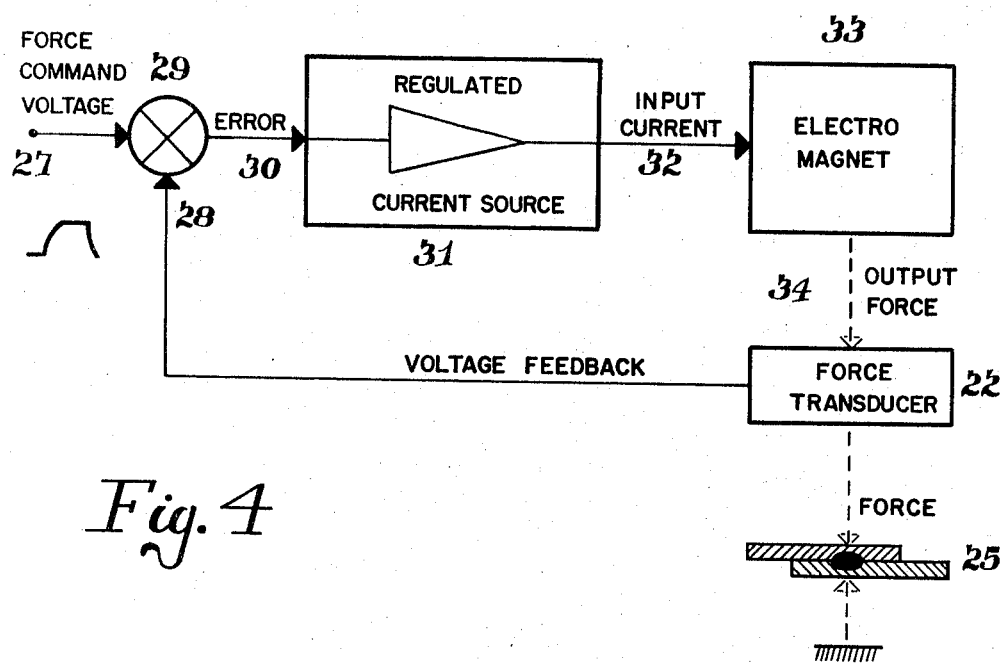
FIG. 4 is a block diagram of the electrical system for use in controlling the force or force program.

FIG. 4 is a block diagram of the closed loop force regulator according to the invention. A feedback voltage 28 which is developed by the force transducer 22 and is proportional to the force being applied between the electrodes and the predetermined reference force command voltages 27 are fed to the summing junction 29 and the difference or error signal voltage 30 is fed to the regulated current source 31 whose output current 32 is fed through the electromagnet 33 in order to develop the required force at the output which is equivalent to the input force command. The voltage analog of the desired program of force to be exerted between the sheets to be welded 25 is fed into the summing junction 29 and through the medium of the regulated current source the input current 32 is fed into the electromagnet 33 so as to produce the desired program of force with respect to time between the electrodes. Since the transducer is directly in line with the electrodes it measures the actual force being applied to the work irrespective of the friction that may exist between the ram 35 and its bearing. Variations in the frictional loss will not effect in any way the actual force which will be delivered to the work since the force changes will follow the force command signals. Examples of several pressure programs that may be realized through the use of this system are illustrated in FIGS. 5 to 8.

Figure 5:
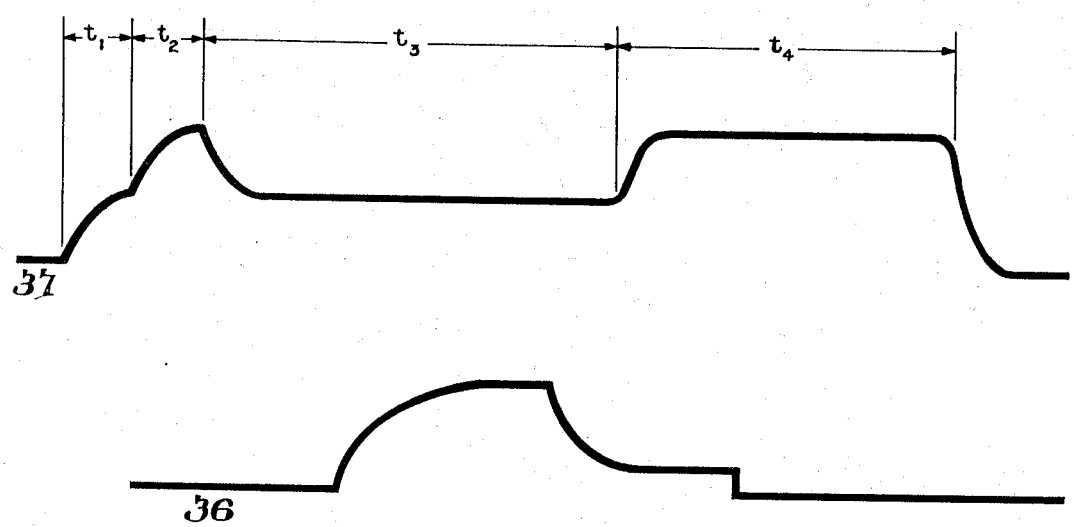

FIG. 5 represents the current wave form 36 and the pressure program 37 for a machine commonly used in the welding of aluminum in which the welding current consists of a unidirectional pulse of welding current having the current time relationship as shown in 36. During the time represented by T1 the force program follows the curve shown. During the time T2 the force is increased in accordance with the curve shown during time T2. At the start of T3 the force is reduced to the level required for welding and the welding current initiated. At the end of T3 the pressure is abruptly increased to the value required for forging the material. By a suitable reference pattern of force command voltage the recompression or forging force may be advanced and adjusted to accommodate the requirements for the welding of a wide variety of materials and thicknesses.

Figure 6:
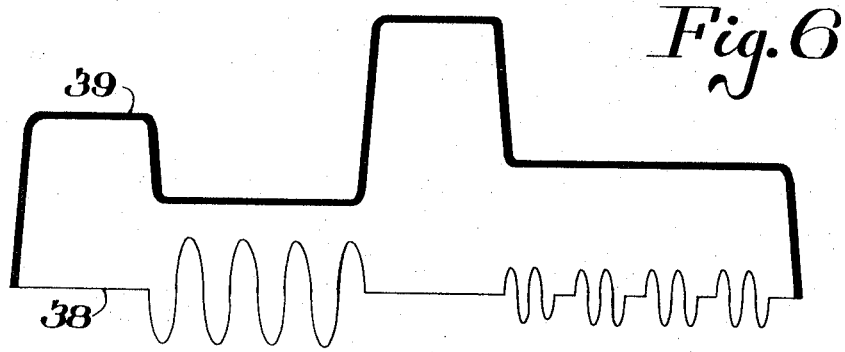

FIG. 6 illustrates the current program 38 and force program 39 which would be utilized in the welding of materials requiring a forging force and postheating. In this case a series of abrupt changes in force are required and may be produced in proper time relationship to the current by the proper input commands to the feedback regulator.

Figure 7:
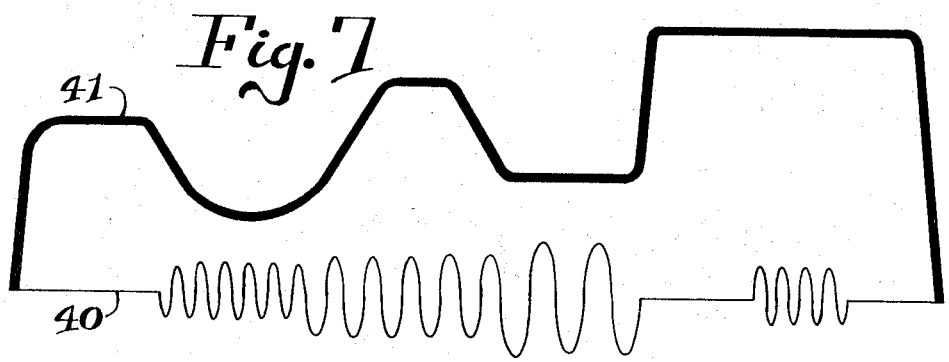
Figure 8:
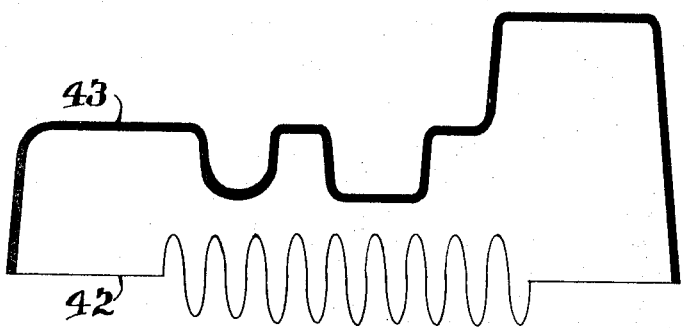

FIGS. 7 and 8 illustrate current force programs in which the force 41 and 43 during portions of the program is made to vary slowly and in other parts to vary abruptly. The complete flexibility and ease with which force programs may be realized is the result of the invention.

The above method and controls may be applied to resistance roll spot welders where the work is advanced in an intermittent fashion by means of roller electrodes as well as to spot welders.

The new method makes it feasible to operate the machine by means of a numerical control, thus allowing the resistance welding machine to fulfill the stringent requirements of spacecraft, jet engine, and similar precision assemblies.

The invention is not to be limited to or by details of construction of the particular embodiment thereof illustrated by the drawings, as various other forms of the device will, of course be apparent to those skilled in the art without departing from the spirit of the invention or the scope of the claims.

What is claimed is:

1. In a resistance welding machine having a movable and a fixed electrode means for applying current to the sheets to be welded, electromagnetic force means including a coil and a fixed and a movable iron magnetic circuit, said moving part of the electromagnetic circuit being fixed to the movable electrode, means for passing current through the coil of the electromagnet and means for varying this current in accordance with a predetermined program, and pneumatic means for placing the electrodes in contact with the work and for retracting the aforementioned movable electrode.

2. Apparatus as in claim 1 including regenerative means for supplying current to the coil of the electromagnet.

3. In a resistance welding machine having a movable and a fixed electrode means for applying current to the sheets to be welded, electromagnetic force means including a coil and a fixed and a movable iron magnetic circuit, said moving part of the electromagnetic circuit being fixed to the movable electrode, means for passing current through the coil of the electromagnet and means for varying this current in accordance with a predetermined program having a duration in excess of one cycle of the supply line frequency.

4. In a resistance welding machine including two electrodes between which the workpieces are to be clamped, electromagnetic means for generating an electrode force between the two electrodes, double-acting pneumatic means co-acting with the electromagnetic means, a force transducer for sensing the force between the electrodes, a reference force command program, a regulated current source responsive to the said reference force command program, and means for connecting the output of the current source to the coil of the electromagnetic means.

5. In a resistance welding machine including two electrodes between which the workpieces are to be clamped, an electromagnet operator having a fixed and movable member for generating a force between said fixed and movable member, a double acting pneumatic operator having a movable piston or diaphragm, a shaft capable of slidable motion fixed to the moving piston or diaphragm of the aforementioned pneumatic operator the shaft sliding within the moving part of the electromagnetic operator so as to engage with said operator after having completed a pre-set portion of its stroke so that the two may co-act one against the other during the remaining portion of the stroke.

6. In a resistance welding machine as in claim 5 a source of current for the electromagnet, additional means responsive to a predetermined force program for varying the current through the coil of the electromagnet in order to produce a predetermined program of force applied to the work.

7. The method of controlling the force exerted by the electrode of a resistance welding machine which comprises sensing the electrode force by means of a transducer, comparing the analog of the force with a pre-set force reference voltage, amplifying the resulting error signal in a current amplifier, passing the output current through the coil of an electromagnetic force generator, which applies a force to the electrodes which develops in the transducer a voltage equal to the force reference voltage.

8. A method in accordance with claim 7 which includes a variable force reference program.

9. A method in accordance with claim 7 which includes a variable force program which produces a sinusoidal variation in force.

10. The method in accordance with claim 7 in which the force transducer is subjected directly to the actual electrode force.

11. A method of producing a force between electrodes of a resistance welding machine comprising passing a current through the coil of an electromagnet thus producing a force tending to close the magnetic circuit including the step of developing a force between the electrodes by pneumatic means and counteracting this force by the force produced by the electromagnet.

12. A method of producing a force between electrodes comprising a pneumatic means for bringing the electrodes in contact with the workpieces and for producing a pre-established gap between the movable and the fixed armature of an electromagnet, and passing a predetermined constant current of a duration in excess of one half cycle of the supply line frequency current through the coil of the electromagnet.

References Cited by the Examiner
UNITED STATES PATENTS

| | | | |
|---|---|---|---|
| 2,862,100 | 11/1958 | Jones | 219—86 |
| 2,892,068 | 6/1959 | Park et al. | 219—86 |
| 2,948,804 | 8/1960 | Schueler et al. | 219—86 |

RICHARD M. WOOD, *Primary Examiner.*

ANTHONY BARTIS, *Examiner.*